US009911239B2

(12) United States Patent
Ramkumar et al.

(10) Patent No.: US 9,911,239 B2
(45) Date of Patent: *Mar. 6, 2018

(54) AUGMENTING A LIVE VIEW

(71) Applicant: A9.com, Inc., Palo Alto, CA (US)

(72) Inventors: Gurumurthy D. Ramkumar, Palo Alto, CA (US); William F. Stasior, Los Altos, CA (US); Bryan E. Feldman, San Francisco, CA (US); Arnab S. Dhua, Mountain View, CA (US); Nalin Pradeep Senthamil, Santa Clara, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,016

(22) Filed: Jan. 9, 2017

(65) Prior Publication Data

US 2017/0116786 A1 Apr. 27, 2017

Related U.S. Application Data

(63) Continuation of application No. 13/117,527, filed on May 27, 2011, now Pat. No. 9,547,938.

(51) Int. Cl.
*G06T 19/00* (2011.01)
*G06F 17/30* (2006.01)
(Continued)

(52) U.S. Cl.
CPC ........... *G06T 19/006* (2013.01); *G06F 3/011* (2013.01); *G06F 3/04842* (2013.01);
(Continued)

(58) Field of Classification Search
None
See application file for complete search history.

(56) References Cited

U.S. PATENT DOCUMENTS 5,960,411 A * 9/1999 Hartman .............. G06Q 10/087
  705/26.8
6,690,393 B2 2/2004 Heron et al.
(Continued)

FOREIGN PATENT DOCUMENTS

IN 10730/DELNP/2013 12/2014
JP 2005-215922 11/2005
(Continued)

OTHER PUBLICATIONS

Xara, "Xara Outsider May 2007 : An Important Letter", posted May 2007, http://www.xara.com/news/may07/tutorial.asp.*
(Continued)

*Primary Examiner* — Sarah Le
(74) *Attorney, Agent, or Firm* — Hogan Lovells US LLP

(57) ABSTRACT

Techniques for augmenting an image of an object captured and displayed in real time with associated content are disclosed. In one embodiment, the method for augmenting the image includes receiving information defining a sampled frame of a video being captured by an electronic device in substantially real time, determining information representative of an object captured in the sampled frame based on the received information, causing the determined information to match stored information defining a plurality of items to locate an item matched to the captured object, retrieving content associated with the matched item, and providing the retrieved content for display with the captured image on the electronic device. The retrieved content may be rendered in an overlay element that overlays the captured image displayed on the electronic device. The rendered content is configured to enable a user to interact with the content.

20 Claims, 11 Drawing Sheets

(51) Int. Cl.

| | |
|---|---|
| *G06F 3/01* | (2006.01) |
| *G06F 15/16* | (2006.01) |
| *G06F 3/0484* | (2013.01) |
| *G06K 9/46* | (2006.01) |
| *G06K 9/62* | (2006.01) |
| *G06Q 30/06* | (2012.01) |

(52) U.S. Cl.
CPC ........ *G06F 15/16* (2013.01); *G06F 17/30047* (2013.01); *G06F 17/30528* (2013.01); *G06K 9/4604* (2013.01); *G06K 9/6202* (2013.01); *G06Q 30/0643* (2013.01); *G06T 19/00* (2013.01); *G06T 2210/12* (2013.01)

(56) References Cited

U.S. PATENT DOCUMENTS

| | | |
|---|---|---|
| 2005/0198095 A1 | 9/2005 | Du et al. |
| 2005/0289590 A1 | 12/2005 | Cheok et al. |
| 2006/0240862 A1 | 10/2006 | Neven |
| 2008/0071559 A1 | 3/2008 | Arrasvuori |
| 2008/0094417 A1 | 4/2008 | Cohen |
| 2008/0143745 A1* | 6/2008 | Jin ................. G06T 3/4038 345/629 |
| 2008/0279481 A1 | 11/2008 | Ando et al. |
| 2008/0300780 A1 | 12/2008 | Domnin |
| 2009/0061901 A1 | 3/2009 | Arrasvuori et al. |
| 2009/0154808 A1* | 6/2009 | Gao ................. G06K 9/00791 382/173 |
| 2009/0289956 A1* | 11/2009 | Douris ............. G01C 21/3602 345/633 |
| 2010/0084470 A1 | 4/2010 | Scott et al. |
| 2010/0103075 A1 | 4/2010 | Kalaboukis et al. |
| 2010/0107187 A1 | 4/2010 | Krantz et al. |
| 2010/0312596 A1 | 12/2010 | Saffari et al. |
| 2011/0035406 A1 | 2/2011 | Petrou |
| 2011/0055049 A1 | 3/2011 | Harper et al. |
| 2011/0072015 A1 | 3/2011 | Lin et al. |
| 2011/0131106 A1 | 6/2011 | Eberstadt et al. |

FOREIGN PATENT DOCUMENTS

| | | |
|---|---|---|
| JP | 2008510254 A | 4/2008 |
| JP | 2008190640 A | 8/2008 |
| JP | 2014-524062 | 9/2014 |
| JP | 5951759 | 6/2016 |

OTHER PUBLICATIONS

European Search Report from Application No. 12792261.5 dated Oct. 13, 2014.
International Search Report from Application No. PCT/US12/39521 dated Aug. 23, 2012.
Chinese Office Action dated Jun. 2, 2016 issued in application serial No. 201280025710.90.
European Search Report dated Dec. 9, 2014 for European Application No. 12792261.5.
Office Action dated Apr. 3, 2015 for Japanese Application No. 2014-513617.
First Chinese Office Action for Patent Application No. 201280025710.9, dated Nov. 4, 2015, with English translation, 12 pages.
European Examination Report for Patent Application No. 12792261.5, dated Feb. 22, 2016, 5 pages.
Japanese Final Office Action for Patent Application No. 2014-513617, dated Jan. 26, 2016, with English translation, 5 pages.
Liu, Xu, et al., "A novel 2D marker design and application for object tracking and event detection." Advances in Visual Computing. Springer Berlin Heidelberg, 2008. 248-257.
Xara, "Xara Outsider May 2007: An Important Letter", posted May 2007, http://www.xara.com/news/may07/tutorial.asp.
Bell, Blaine, Steven Feiner, and Tobias Hollerer. "View management for virtual and augmented reality." Proceedings of the 14th annual ACM symposium on User interface software and technology. ACM, 2001.
Non-Final Rejection issued in U.S. Appl. No. 13/117,527, dated Feb. 21, 2013.
Final Rejection issued in U.S. Appl. No. 13/117,527, dated Jun. 28, 2013.
Non-Final Rejection issued in U.S. Appl. No. 13/117,527, dated Nov. 20, 2013.
Final Rejection issued in U.S. Appl. No. 13/117,527, dated Mar. 26, 2014.
Non-Final Rejection issued in U.S. Appl. No. 13/117,527, dated Jul. 17, 2014.
Final Rejection issued in U.S. Appl. No. 13/117,527, dated Dec. 18, 2014.
Non-Final Rejection issued in U.S. Appl. No. 13/117,527, dated Mar. 27, 2015.
Final Rejection issued in U.S. Appl. No. 13/117,527, dated Sep. 9, 2015.
Non-Final Rejection issued in U.S. Appl. No. 13/117,527, dated Dec. 4, 2015.
Final Rejection issued in U.S. Appl. No. 13/117,527, dated May 6, 2016.
Notice of Allowance issued in U.S. Appl. No. 13/117,527, Sep. 7, 2016.

* cited by examiner

AUGMENTING A LIVE VIEW

CROSS-REFERENCES TO RELATED APPLICATIONS

This application is a continuation of allowed U.S. application Ser. No. 13/117,527, entitled "Augmenting A Live View," filed May 27, 2011; the full disclosure of which is incorporated herein by reference for all purposes.

BACKGROUND

Various conventional content delivery systems enable the user of a computing device (e.g., a smartphone) to obtain content related to an image the user has provided, such as by capturing the image using a camera of the computing device. For example, a user may capture an image of a movie poster through the camera and upload the captured image to a content delivery system. In turn, the content delivery system returns content related to the movie associated with the movie poster (e.g., information about the movie, multimedia content, etc.).

In order to deliver content related to the uploaded image, a conventional content delivery system attempts to match the image received from the client device against images stored in the content delivery system's image database. The image database can store thousands of images from magazines, posters, newspapers, the Internet, etc. For example, the image database can store the images of wall posters and billboard advertisements corresponding to a particular movie "X". Consequently, when the content delivery system receives the image of the poster of the movie "X" from a communication device, the system attempts to match the received image with all the images stored in its image database. Such an approach can be very resource intensive, and can provide significant lag time when a user submits a request to a system with a large set of images that must be analyzed.

DETAILED DESCRIPTION OF THE INVENTION

Various embodiments provide methods and/or systems for delivering content in response to matching image information. In particular, content can be delivered to a communication device, such as a computing device or client system, in response to an image being provided from that communication device. The image might contain at least one object of interest, and one or more images of the object can be captured and uploaded by the communication device in substantially real time, such as where images are uploaded shortly after a time of capture. The image information can be compared against information in an image database that matches the object(s) captured in real time, in order to determine an identity or other information about the object that can be used to determine the related content. Detection and recognition components can be used to analyze the image information uploaded by the communication device to determine whether the image matches any item, product, or other type of content stored in, for example, a content repository. The content repository can be regularly updated with the latest content by a content provider.

Various embodiments also include an overlay service that, when the detection and recognition components determine content associated with the object, for example, retrieves the associated content and provides the associated content to the communication device in substantially real time. In at least some embodiments, the content can be rendered such that the content augments (e.g., overlays) a currently displayed image of the object being captured by the communication device, for example, in a video frame. The content overlay elements may take different shapes and forms, such as may include a box, a button, a 3D structure, animation, and the like. The content overlay may be interactive, such that the overlay may allow a user to access the rendered content, edit the content, conduct a search based on the rendered content, share the content with peers, export the content, and the like.

Figure 1:
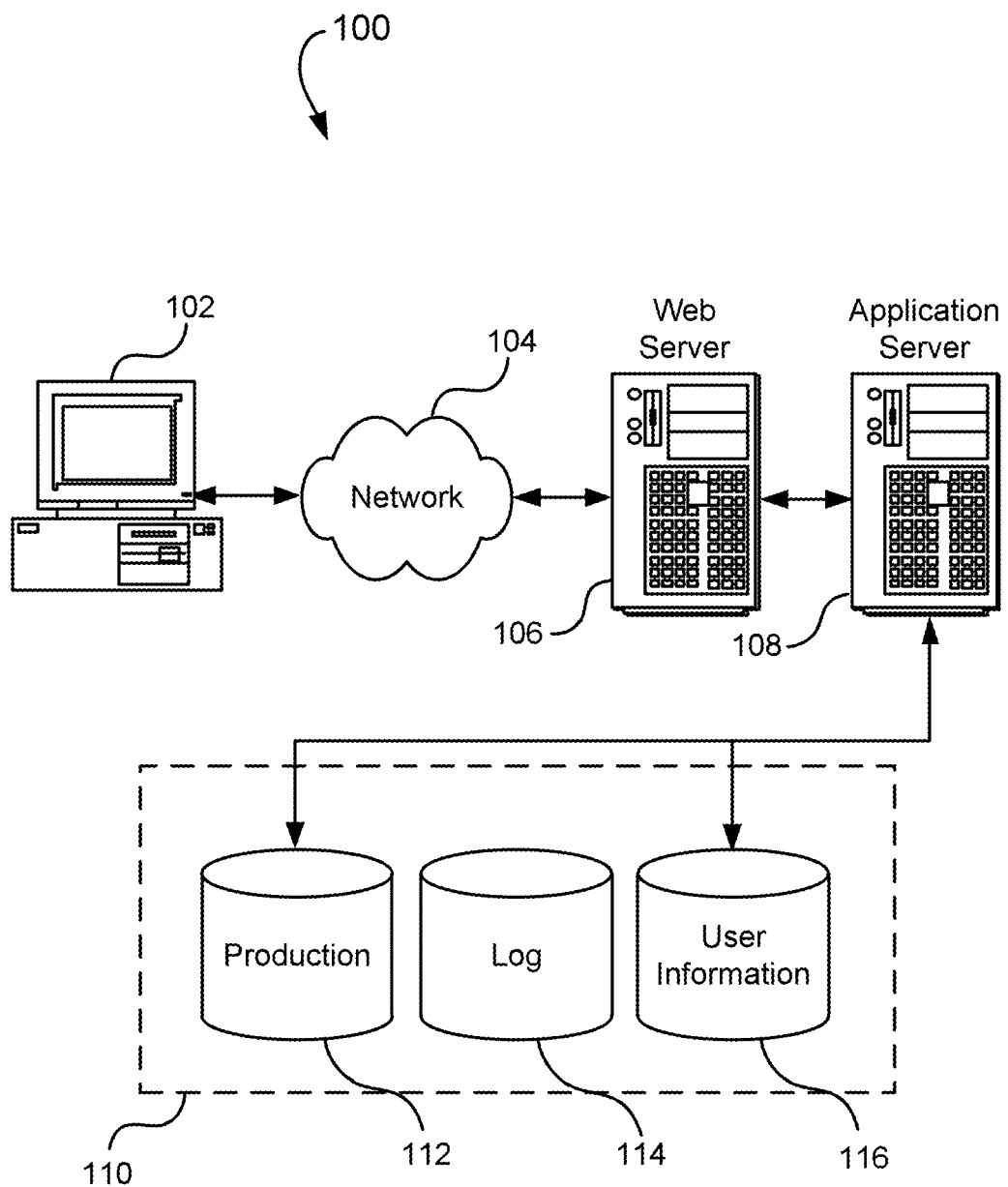
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
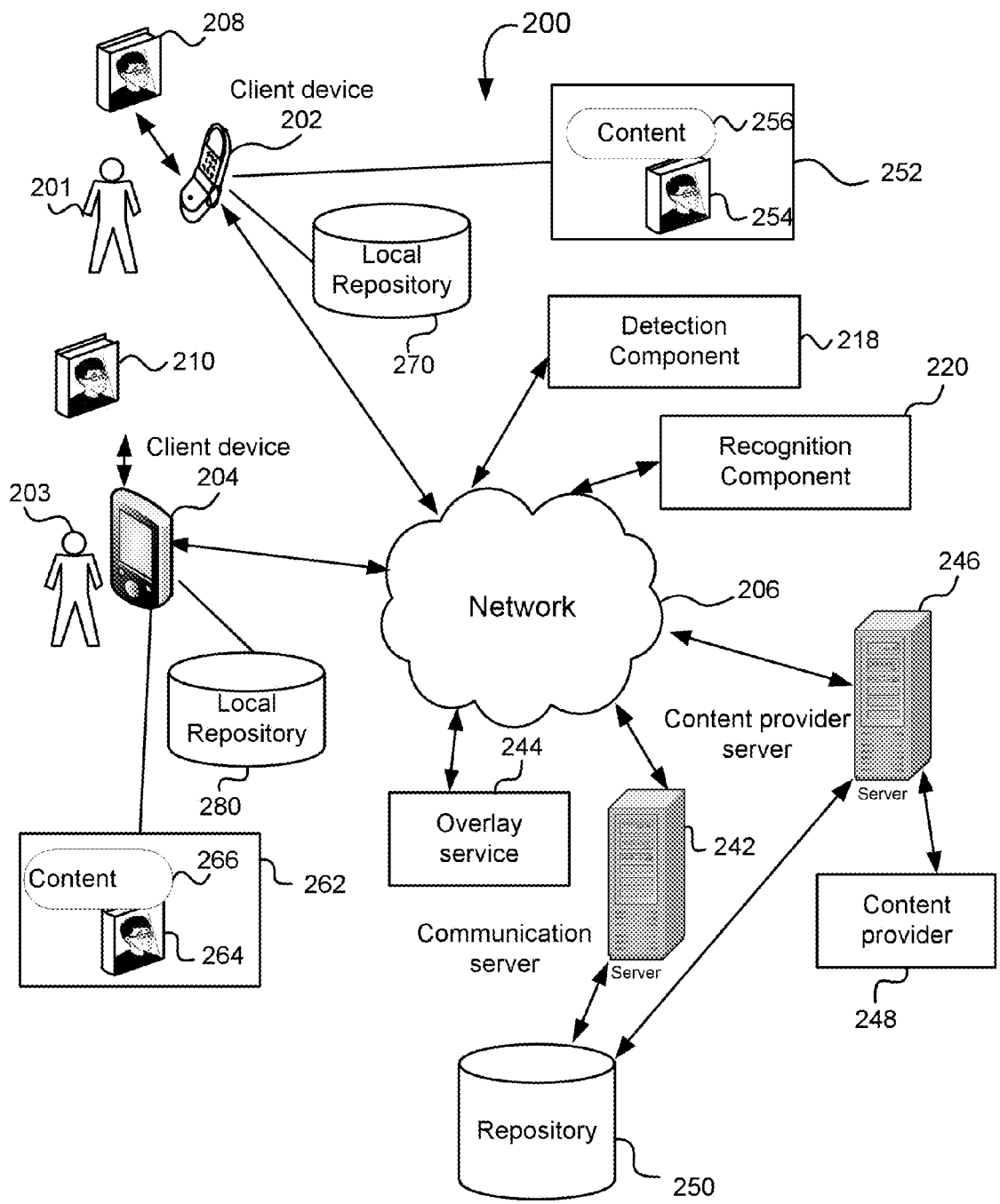
FIG. 2 illustrates a diagrammatic representation of an environment which may incorporate one or more components that are described above in connection with FIG. 1 and that may be used in accordance with various embodiments.

FIG. 2 shows an example environment 200 in which various embodiments may be practiced. The environment 200 may be realized utilizing one or more of the components of the environment described above in connection with FIG. 1. The environment 200 represents an example of an "augmented reality" environment. Augmented reality (AR) is a term for a live direct or an indirect view of a physical, real-world environment whose elements are augmented by computer-generated sensory input, such as sound or graphics. Augmentation is done conventionally in real-time and in semantic context with environmental elements. With the help of advanced AR technology, the information about the surrounding real world of the user becomes interactive and digitally manipulable. Artificial information about the environment and its objects can be overlaid on the real world.

The environment 200, in an embodiment, includes a plurality of users 201 and 203 that utilize a network, such as the Internet 206, to browse content of various content providers using client computing (communication) devices 202 and 204. The environment 200 may utilize the Internet as a network; however, it should be understood that other networks may be used as an alternative to or in addition to the Internet. Examples of other networks include mobile networks, intranets, and generally any suitable communications network. It will be appreciated that a number of users and associated computing devices may vary and users 201 and 203 with associated computing devices 202 and 204 are shown merely for illustrative purposes.

As discussed above, client computing devices 202 or 204 may be any mobile communication device equipped with an image capture element, for example, a mobile phone, tablet PC, Personal Digital Assistant (PDA), Augmented Reality (AR)-enabled glasses, head-mounted display, and the like. The devices 202 and 204 may also include desktop computers, notebook computers, electronic book readers, personal data assistants, video gaming consoles or controllers, television set-top boxes, and portable media players, among others. The communication device 202 or 204 may have a display screen, which under normal operation will display information to a user (or viewer) facing the display screen (e.g., on the same side of the computing device as the display screen, as the device 204 illustrates). The enlarged versions of the client computing devices' display screens are illustrated by elements 252 and 262.

The communication device can include one or more image capture elements, for example, including two image capture elements on the front of the device and two image capture elements on the back of the device, although it should be understood that additional or fewer image capture elements could be used, and could also, or alternatively, be placed on the sides, corners, or other locations on the device. The image capture elements also can be of similar or different types. Each image capture element may be, for example, a camera, a charge-coupled device (CCD), a motion detection sensor or an infrared sensor, or can utilize other image capturing technology. The computing device can also include at least one microphone or other audio capture element capable of capturing audio data, and one or more orientation-determining elements such as an accelerometer, gyroscope, digital compass, or inertial sensory, that can assist with movement and/or orientation determinations. The components comprising the client computing (communication) device will be described in greater detail in reference to FIG. 8.

Referring back to FIG. 2, in an embodiment, users 201 and 203 may access content provided by content providers in order to consume content, search for information, purchase items offered for consumption or sale, engage in social networking and the like. As shown in FIG. 2, the environment 200 may include a communication server 242 operated by an overlay service provider 244 and a content provider server 246 operated by a content provider 248. As will be described below in greater detail, a back end server may not be needed in some embodiments to provide and support the described functionality. Functionalities provided by servers 242 and 246 may be distributed between the servers as shown. Generally, one or more servers may be configured to provide the functionality implemented on the servers 242 and 246. Accordingly, the servers 242 and 246 are shown in FIG. 2 as two separate elements for merely illustrative purposes. As will be appreciated, a single electronic entity (not shown) may operate the system elements 242, 244, 246, and 248. Alternatively, different entities may control the elements 242, 244, 246, and 248. The electronic entity or entities may operate, affiliate with, or associate with one or more of the providers 248 in a number of different ways.

In an embodiment, the environment 200 includes components and instructions for generating content rendered in overlay elements 256 and 266 on the device screens 252 and 262. The content providers 248 may offer various types of content, such as electronic games, news, video, shopping or other services, search engine services, audio, social networking services, and the like. It should be understood that any type of content may be included in the environment 200 or variations thereof. Content may be provided in various ways, such as through an application interface or through other mechanisms that may not be properly classified as Web sites. In the example illustrated in FIG. 2, the content provider 248, via the content server 246, provides content 256 and 266 to be rendered on the screens 252 and 262 in conjunction with images 254 and 264 of objects 208 and 210 captured by the devices 202 and 204 respectively through their image capture elements.

As shown in FIG. 2, the user 201 points his device 202 at the object 208 in order to capture the image of an object that is subsequently displayed (254) on the screen 252. Similarly, the user 203 points his device 204 at the object 210 in order to capture the image of an object that is subsequently displayed (264) on the screen 262. At this point, detection component 218 and recognition component 220 are launched in order to determine whether the object 208 (210) captured by the image capture element associated with the device 202 (204) is identifiable. In an embodiment, the object may be displayed on a screen 252 (262), for example, in a camera view of the camera (i.e., the image capture element) of the device 202 (204). If the object is identified by the detection and recognition components 218 and 220, overlay service 244 associated with the communication server 242 and/or content provider server 246 retrieves from content repository 250 and provides in a special form, e.g., a overlay element 256 (266), information associated with the object to overlay the image object 254 (264) on the screen 252 (262).

The detection component 218, recognition component 220, and overlay service 244 may be associated with the system 200 in a number of different ways. For example, instructions to execute some or all of these elements may reside, and execute, on client devices 202 and 204. Alternatively, some or all of the above components may be accesses via the network 206 using communication server 242 and/or content provider server 246. In one embodiment, Overlay service may reside on a client device rather than on a server. Furthermore, some or all of the data associated with the repository may be stored (cached) in a local repository 270 (280) residing on the client device 202 (204), as will be described below in greater detail. The detection, recognition, and overlay functionalities and their applications will be discussed more fully below in reference to FIGS. 3-7.

Figure 3:
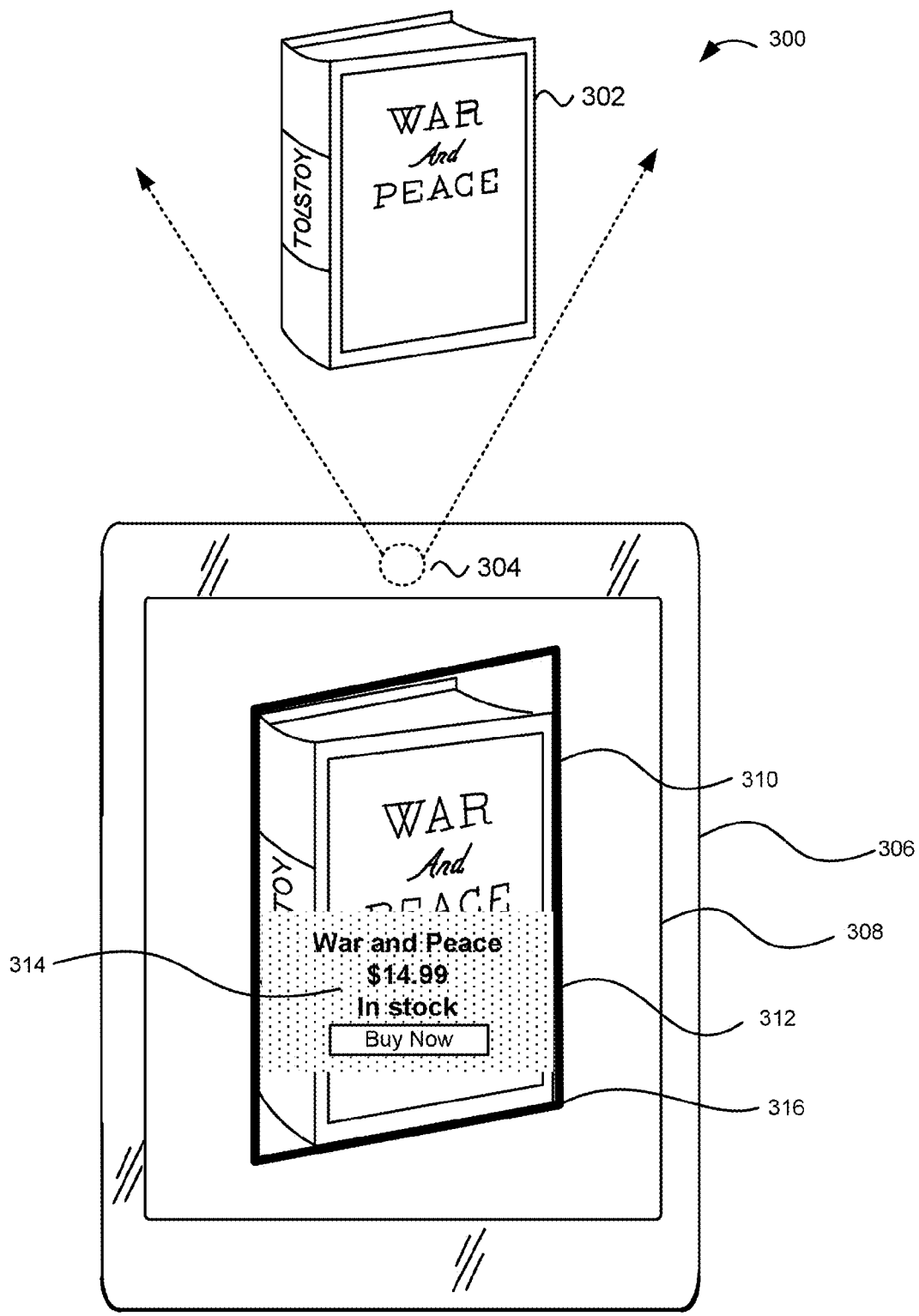
FIG. 3 illustrates an example of augmenting an image of an object captured and displayed in real time with associated content as rendered on the electronic device in accordance with an embodiment.

FIG. 3 illustrates an example of augmenting an image of an object captured and displayed in real time with associated content as rendered on the electronic device in accordance with an embodiment. An object of interest 302 (a book War and Peace) is captured with an image capture element (e.g., a camera 304) of an electronic device 306 as illustrated with two arrows originating at the camera and pointing at the object of interest. The electronic device display 308 renders an image 310 of the object 302 taken with the image capture element 304. The image 310 is augmented with an overlay element 312 containing product information 314 rendered in substantially real time in response to the object identification and submission to the overlay service as described above in reference to FIG. 2. In an embodiment, the image and the overlay element are rendered within a bounding box 316 computed as described below in greater detail, which in at least some embodiments approximates a boundary of a determined object in the displayed image information. In this example, the overlay element 312 is a rectangle partially overlaying the image 310 of the book 302 and contained within the bounding box. It should be understood that in some embodiments the bounding box might be calculated but not necessarily displayed to an end user.

Figure 4:
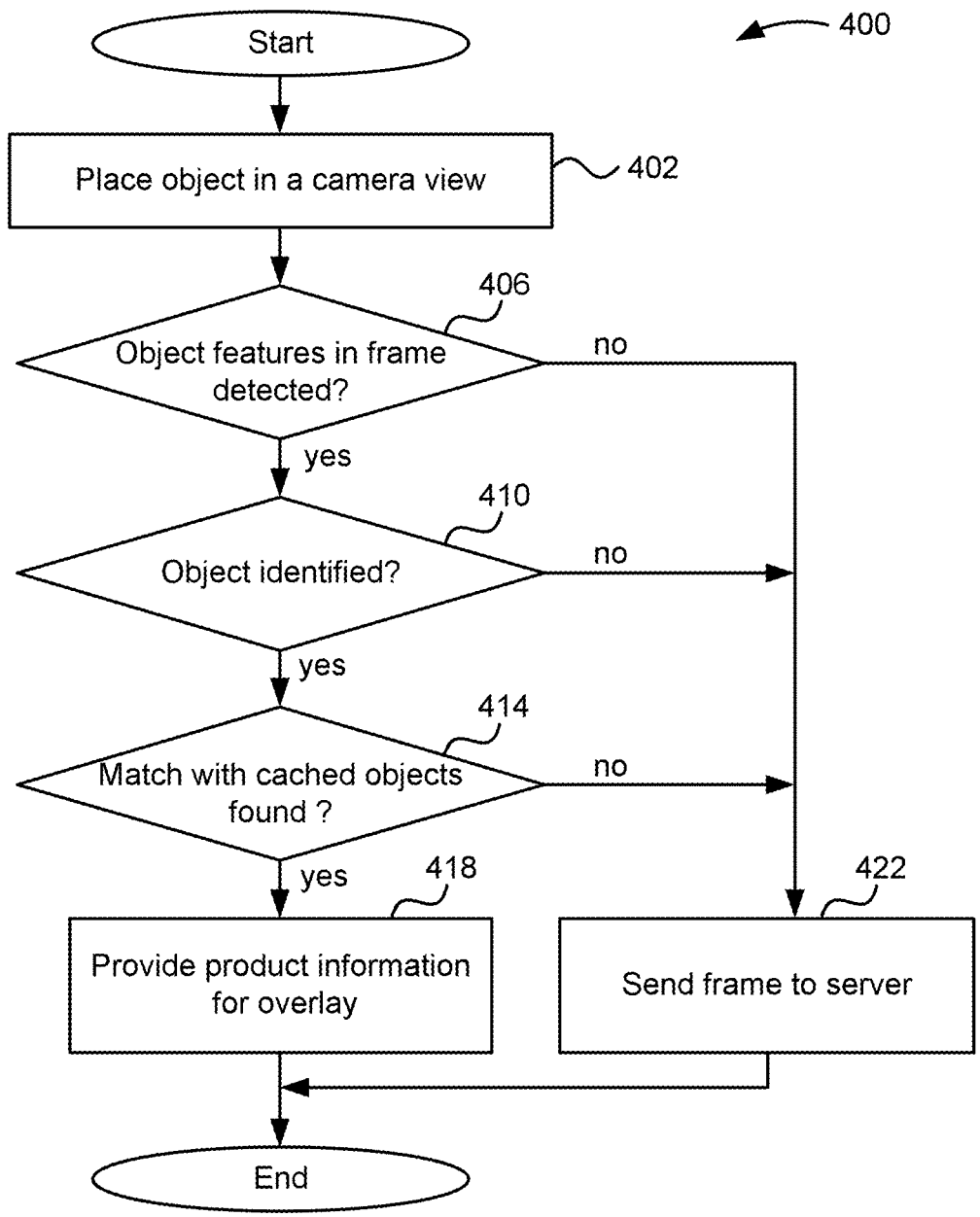
FIG. 4 illustrates a process flow diagram for augmenting an image of an object captured and displayed in real time with associated content in accordance with an embodiment.

FIG. 4 is a process flow diagram 400 illustrating the method for overlaying an image in live view of a camera with relevant content. The process 400 begins at block 402, where an object is placed in the device camera view. In other words, the user is pointing a camera associated with the user device at a particular object (e.g., a book on a bookshelf) and a frame with the object appears in the camera view. At decision block 406, it is determined whether any object features have been detected with the detection algorithm. If no features are detected, the process moves to block 422. If at least one object feature is detected, at decision block 410, it is determined whether the object associated with determined features is identified. If the object is not identified, the process 400 moves to block 422. If the object is identified, the process moves to block 414, where an object is compared with products or items stored in an item repository. In one embodiment, the item or product information may be cached in a storage associated with the client device. If at decision block 414, no match is found, the process moves to block 422. If the match is found, at block 418, the product information is rendered to the user. At block 422, a frame or a selected features in the frame are sent to a server for further object recognition. Thus, local client side object recognition and server side object recognition may occur in two phases. In one embodiment, all tasks associated with object recognition occur on the server side when a frame containing an image of the object is sent to a server. The process 400 then ends.

Figure 5:
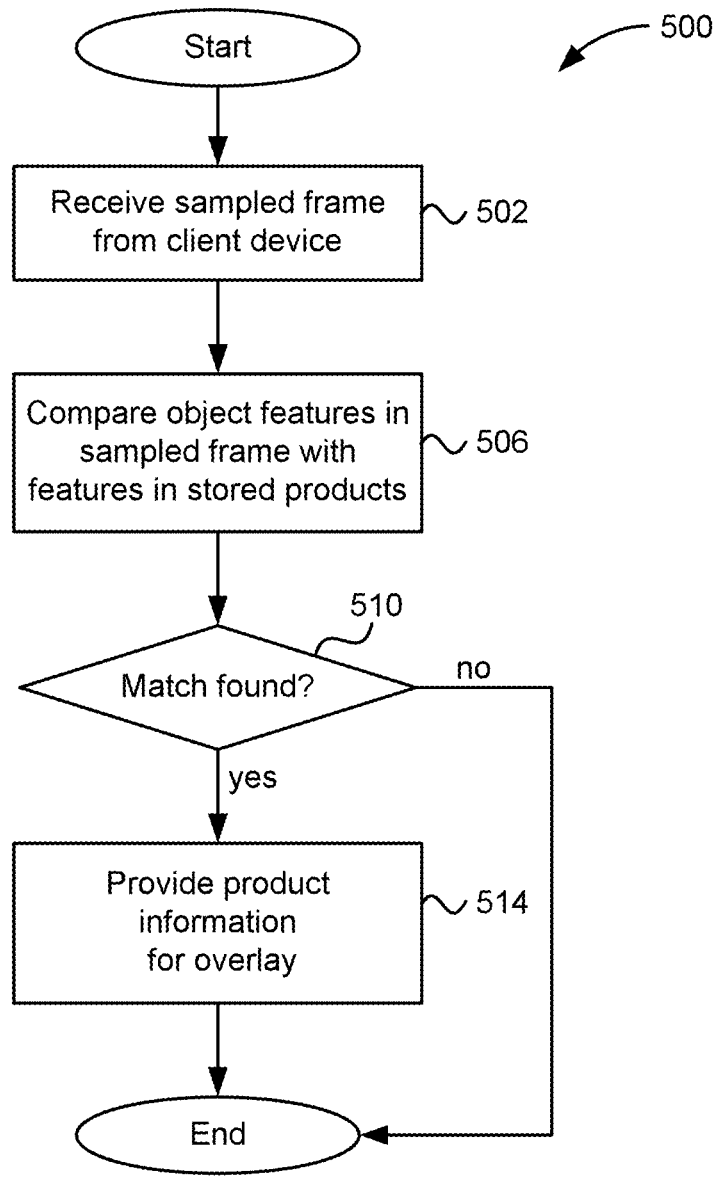
FIG. 5 illustrates a process flow diagram for an example of detection techniques used in augmenting an image of an object captured and displayed in real time with associated content in accordance with an embodiment.

FIG. 5 is a process flow diagram illustrating an example of an object recognition technique on a server side in accordance with an embodiment. The process 500 begins at block 502, where a sampled frame is received from a client device. At block 506, object features determined in a sample frame are compared with those of the stored items (products). The detection/recognition techniques are described below in greater detail. At decision block 510 it is determined whether a match with any of the stored objects is found. If the match is found, at block 514 information associated with the matched product is sent to a client device for overlay. The process 500 then ends.

Figure 6:
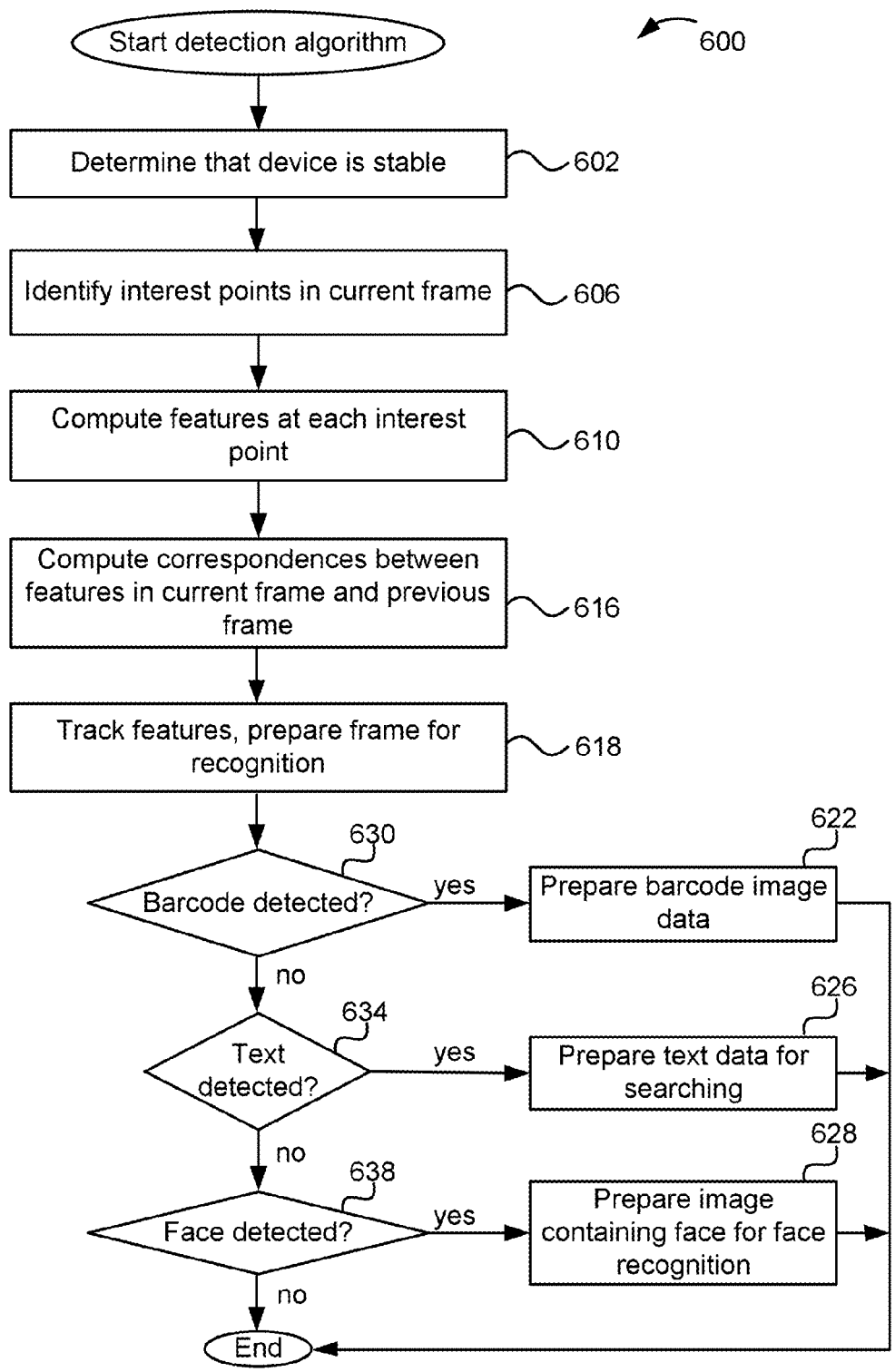
FIG. 6 illustrates a process flow diagram of a server-side object recognition technique in accordance with an embodiment.

FIG. 6 is a process flow diagram illustrating an example of an object feature detection routine 600. The process 600 begins at block 602, where it is determined the device pointed at an object is in stable condition to ensure sufficient quality of the taken image that will provide for successful object detection and recognition. Determination of whether the camera is stable may be done using various techniques, for example, using sensor inputs associated with an accelerometer, solid state compasses, gyroscope and the like. At block 606, interest points in the current frame are identified. Interest points may be identified by using, for example, an interest point detection algorithm such as Harris Interest Points detection algorithm, Moravec corner detection algorithm, FAST or the like.

At block 610, features corresponding to each interest point are computed. Feature is a piece of information which is relevant for solving the computational task related to a certain application. More specifically, features can refer to the result of a general neighborhood operation (feature extractor or feature detector) applied to the image, or specific structures in the image itself, ranging from simple structures such as points or edges to more complex structures such as objects. Other examples of features are related to motion in image sequences, to shapes defined in terms of curves or boundaries between different image regions, or to properties of such a region. Features at each interest point may be computed using, for example, a feature computation algorithm such as an Accumulated Signed Gradient (ASG) or the like. At block 616, correspondences between features in the current sampled frame and previous sampled (e.g., the last sampled) frame are computed. Correspondences between features may be used to determine a homography, i.e., a geometrically consistent transformation between feature points. It is known to one skilled in the art that homography is a matrix that transforms a set of feature points from a given position to a new transformed position. More generally, a homography is an invertible transformation from the real projective plane to the projective plane that maps straight lines to straight lines. In the field of computer vision, any two images of the same planar surface in space are related by a homography. At block 618, image features are tracked. Image features may be tracked using homography. Homography may be computed using, for example, RANSAC algorithm. If the homography from previously tracked frame is large enough, a frame is selected and prepared for recognition phase described below with reference to FIG. 7.

There are several common types of information that may help indicate what object is displayed in the frame. One such example is a barcode that uniquely identifies the object. Accordingly, at decision block 630, if a barcode is detected in the frame the barcode image data is prepared and submitted to the recognition algorithm, at block 622. Another common type of information that may help identify the object is textual information. Thus, if a barcode is not detected, it is determined whether any text exists in the image, at block 634. If text is detected, the text is prepared for subsequent searching. Another common type of information is an image within the frame (e.g., a person's face). If no text is detected, at decision block 638, it is determined whether any face within the image is detected. If no face is detected, the process ends. If the face is indeed detected, the image containing the face is prepared for a face recognition algorithm, as described below in reference to FIG. 6. The process 600 then ends. While a barcode, textual information and facial images are discussed above, other types of information within a frame may be used to detect object within the fame.

Figure 7:
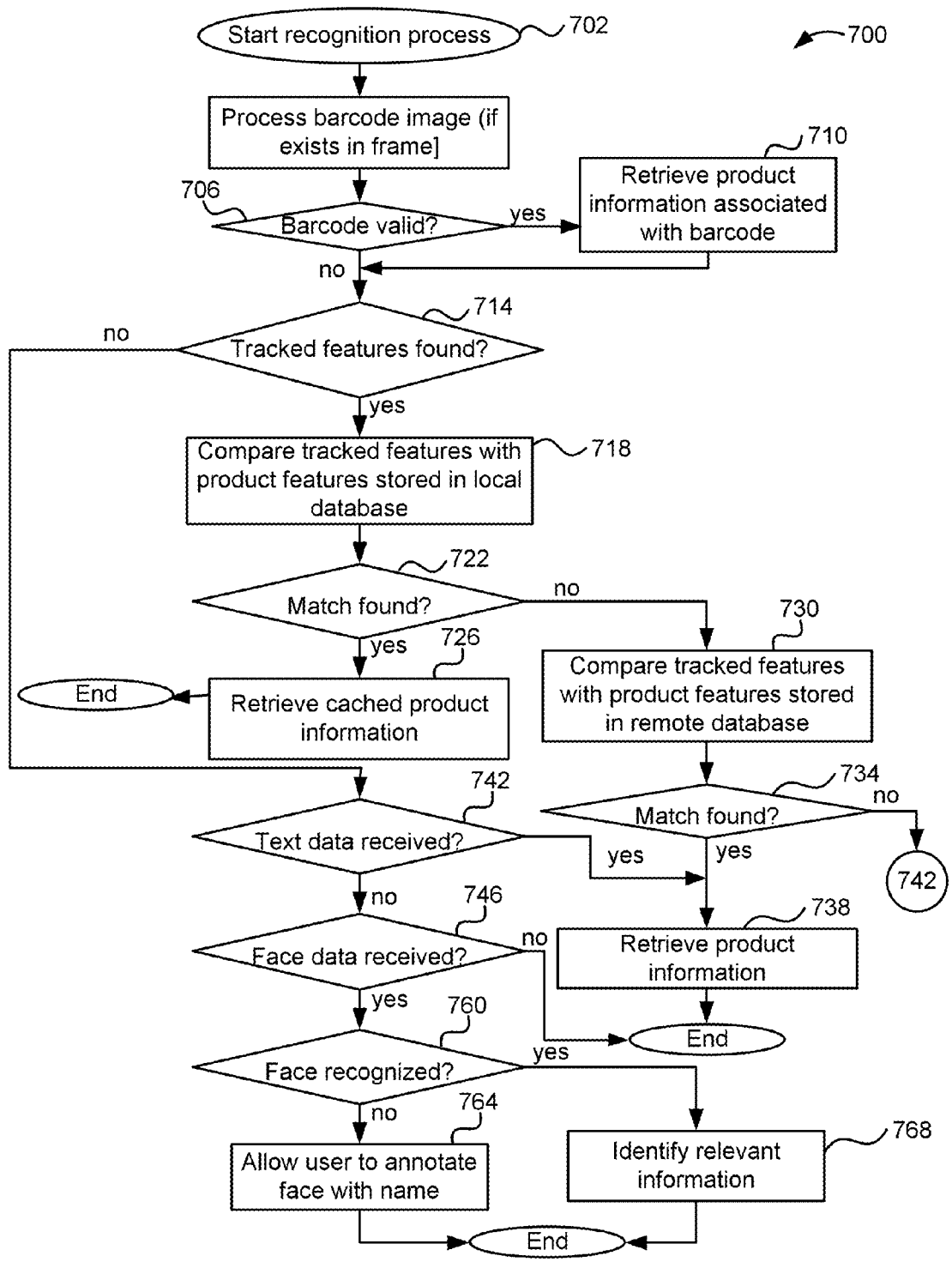
FIG. 7 illustrates a process flow diagram for an example of recognition techniques used in augmenting an image of an object captured and displayed in real time with associated content in accordance with an embodiment.

FIG. 7 is a process flow diagram illustrating an example of an object recognition in accordance with an embodiment. The process 700 starts at block 702, where the barcode image data is processed. At decision block 706, it is determined whether the barcode is valid. For that purpose, a barcode may be decoded using a barcode decoding technique and then the barcode validity may be confirmed per UPC-A, UPC-E or other known barcode standards. If the barcode is not valid (or is illegible), the process continues at block 714. If the barcode is valid, the product information associated with the barcode is retrieved. The product information may include various data about the product (i.e., object), including, in an embodiment, a title of the product and the price of the product.

At decision block 714, it is determined whether any tracked features are found by the detection algorithm as described above in reference to FIG. 6. If no such features are found, the process moves to decision block 742. If any feature is found, at block 718, the features are compared with product features stored in the local repository associated with the client device. At decision block 722, it is determined whether any tracked features match with the product features of previously detected products that are stored in a local repository. If a match is found, at block 726, the cached product information is retrieved from the local repository. If no match is found, at block 730, the image frame is then sent to the server and the server compares tracked features in the frame to product features stored in a repository remote from the client device. It may be advantageous to detect the product and retrieve associated product information from the local repository because it is a fast way of determining needed product information. If no product information is found in a local repository, the image frame is sent to the server for further detection/recognition. At decision block 734, it is determined whether any match (or correlation at an acceptable level) between the tracked features and features of the products stored in the remote repository is found. If no match (correlation) is found, the process moves to decision block 742. If the match (correlation) is found, the product information associated with the product with matched features is retrieved at block 738 and the process ends.

As discussed above, there are several common types of information used to detect objects, including text data, barcode data, or face data. At decision block 742, it is determined whether any text data is received. If the text data is received, the text may be validated and, if found valid, the recognized text may be used to retrieve product information associated with the recognized text at block 738. If no text data is received, at decision block 746, it is determined whether the face data is received. If no face data is received at decision block 760, it is determined whether the face is recognized. If the face is recognized, at block 768, information associated with the recognized face is identified. In one embodiment, the information may comprise data related to a person whose face was identified. If no face is recognized at block 764, the user is allowed to annotate the face displayed in the user camera view with a relevant name for future recognition purposes. The process 700 then ends.

In one embodiment, the recognition algorithm may be applied exclusively. Specifically, if the recognition algorithm is performed on the user device, in order to optimize CPU usage, when one of the parts of the recognition algorithm is in progress (e.g., as barcode recognition), then the other parts (e.g., product cover recognition) may not be performed.

Figure 8:
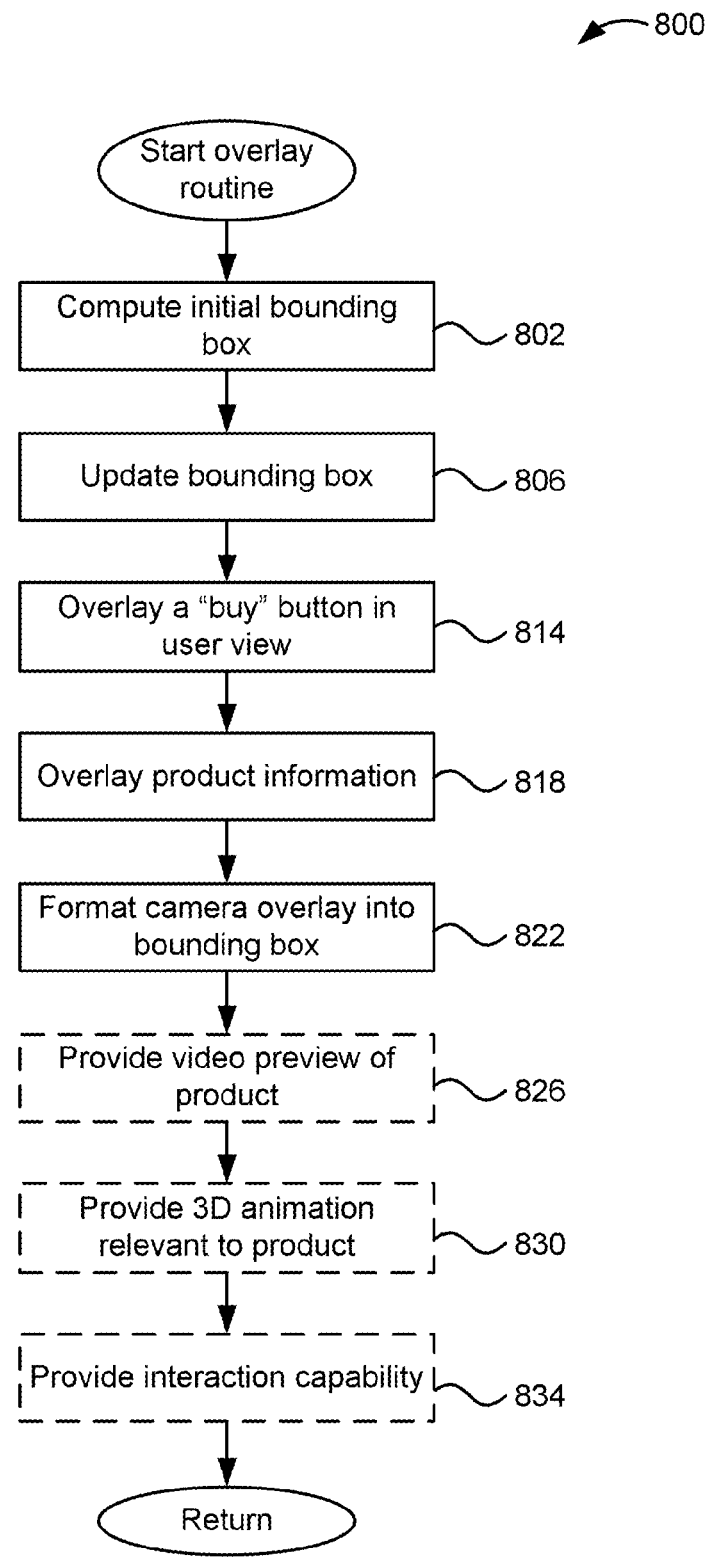
FIG. 8 illustrates a process flow diagram for an example of overlaying techniques used in augmenting an image of an object captured and displayed in real time with associated content in accordance with an embodiment.

FIG. 8 is a process flow diagram illustrating an example of an overlay routine 800. The process 800 begins at block 802 where an initial bounding block is computed. The initial bounding box may be computed by mapping the corners of an image of the object found in the repository to the image submitted with a query using the homography implied by a successful image match. At block, 806, the bounding blocks are updated. An updated bounding box for each frame may be computed by applying the homography from tracking to the corners of the initial bounding box. Effectively, the computation aims at drawing a bounding box around the image in the user's view.

The bounding box computation may not always be reliable. For example, too few feature points may be available for tracking, the feature points may cover too small a portion of the image, or the homography may be unstable. To limit erratic variation of the bounding box, the validity of the homography may be checked so that the box does not have perspective distortion beyond a particular (e.g., predetermined) level, and that bounding does not change unrealistically. The bounding box may be "snapped" to the nearest sharp edges so as to make the bounding box look more natural.

At block 814, an overlay content may be overlaid in the user view. By way of example only, the overlay content may be selectable content (e.g., a "Buy" button) so that the user may purchase the product displayed in the display screen with a single click and minimal effort within the camera view. This technique may be described as "one click in augmented reality."

At block 818, the retrieved product information may augment (overlay), within the calculated bounding box, the image in the user view. The product information may vary. For example, the product information may include, but may not be limited to, an item price, customer rating, reviews, description, special offers and promotions link to the same product in other formats, a link to a digital download, lists, customer discussions, information related to other products purchased by those who bought the object (product), and the like. The information overlayed in block 818 is optional.

At block 822, the overlay content element is formatted onto the bounding box. In an embodiment, this can be done in a 3D format in order to make good use of display "real estate." For example, an overlay element may include a 3D structure (such as a cube) that may overlay the image of the object in the user's view on the device's display. Each wall of the cube may contain content related to the product (object), for example, one wall may display the price of the product, another wall may display a review of the product, and so on. In addition to, or instead of, product information, selectable content elements (e.g., "Buy," "Add to cart" or "Select" buttons) may be added to the overlay element (e.g., a 3D structure described above) so as to enable a user to interact with displayed content.

Other types of content (than that discussed above) may overlay the image displayed in a user's view. For example, video previews of the product may be displayed to a user within the boundaries of the object's image as shown at block 826. In an embodiment, a movie preview of a DVD whose image is displayed in a user's view may be provided, a preview of a game for a displayed toy may be provided, a video explaining how to use a particular product may be provided, and the like. At block 830, a 3D animation relevant to product may be also provided to the user. For example, if an object whose image was captured is a book, an animation showing the book cover opening and displaying content inside the book may be provided. As described above, selectable ("clickable") content elements may be added to the animation and may be made such as links to details and further content in order to enable a user to interact with the content, as shown at block 834. Thus, in the above example, the animation with added selectable content elements may allow the user to "flip" the pages of the displayed book and show the content of each flipped pages. The process 800 then ends.

Figure 9:
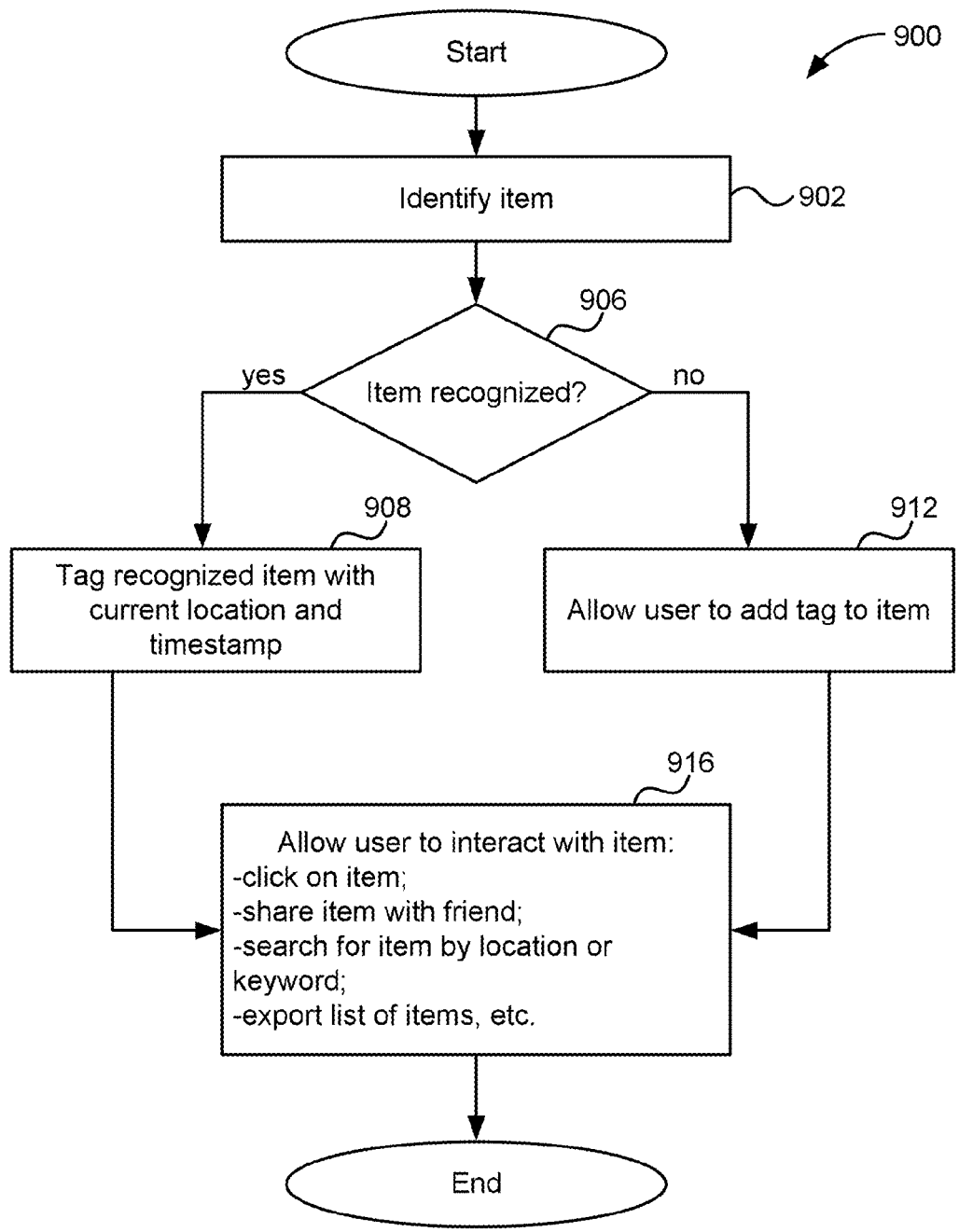
FIG. 9 illustrates a process flow diagram for an example of tagging techniques used in augmenting an image of an object captured and displayed in real time with associated content in accordance with an embodiment.

FIG. 9 is a process flow diagram illustrating the method for tagging objects (e.g., items or products) presented to the user. Tagging items may allow a user to create lists of products and to extract information from the created lists. The created lists or individual products within the lists may be shared with other users, for example, by means of social networking (e.g., through Facebook® or Twitter®). The process 900 begins at block 902 where a product is identified as described above in reference to FIGS. 3-5. At decision block 906, it is determined whether a product is recognized. If the product is recognized, at block 908, the recognized item is tagged, for example, with the current location and time stamp. If the product is not recognized, at block 912, a user is allowed to add a tag to a product, for example, manually add a definition or description of the product.

At block 916, additional interaction capabilities are provided to the user. For example, the user is allowed to click on a displayed product, share a product with a friend, search for a product by location or keyword, show products as thumbnails in live display view and allow user to click on a thumbnail to view details, export the list of products (e.g., as an email or a file) for use by the user, add a text label, and the like. In the example of a book discussed above, a user may add a label to the product that states that the book is lent to the user's friend or that the book belongs to the user's library. The process 900 then ends.

Figure 10:
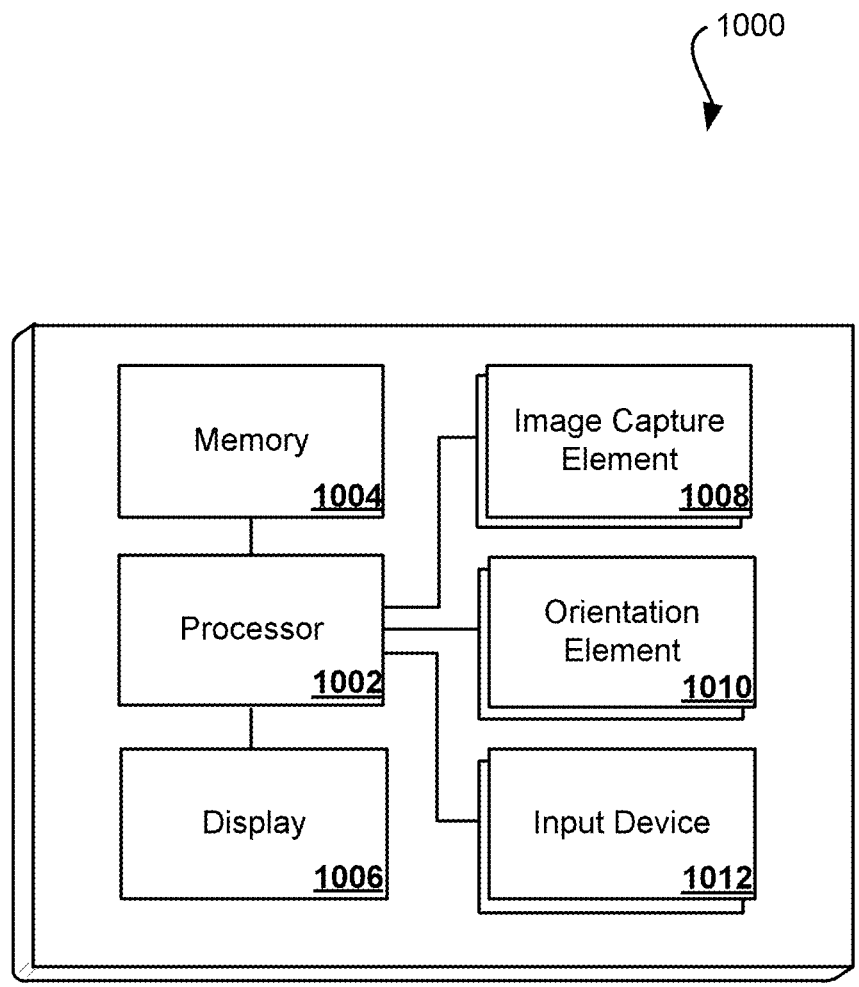
FIG. 10 illustrates example components of an electronic device used in augmenting an image of an object captured and displayed in real time with associated content in accordance with an embodiment.

FIG. 10 illustrates a set of basic components of a communication device 1000 such as the device 202 described with respect to FIG. 2. In this example, the device includes at least one processor 1002 for executing instructions that can be stored in a memory device or element 1004. The instructions may include instructions related to detection, recognition, and overlay components described above. The device can include many types of memory, data storage or computer-readable media, such as a first data storage for program instructions for execution by the processor 1002, the same or separate storage that can be used for images or data, a removable memory that can be available for sharing information with other devices, and any number of communication approaches that can be available for sharing with other devices. The device typically will include at least one type of display element 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least two image capture elements 1008, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc.

The device can include at least one orientation determining element 1010, such as an accelerometer, digital compass, electronic gyroscope, or inertial sensor, which can assist in determining movement or other changes in orientation of the device. The device can include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 11:
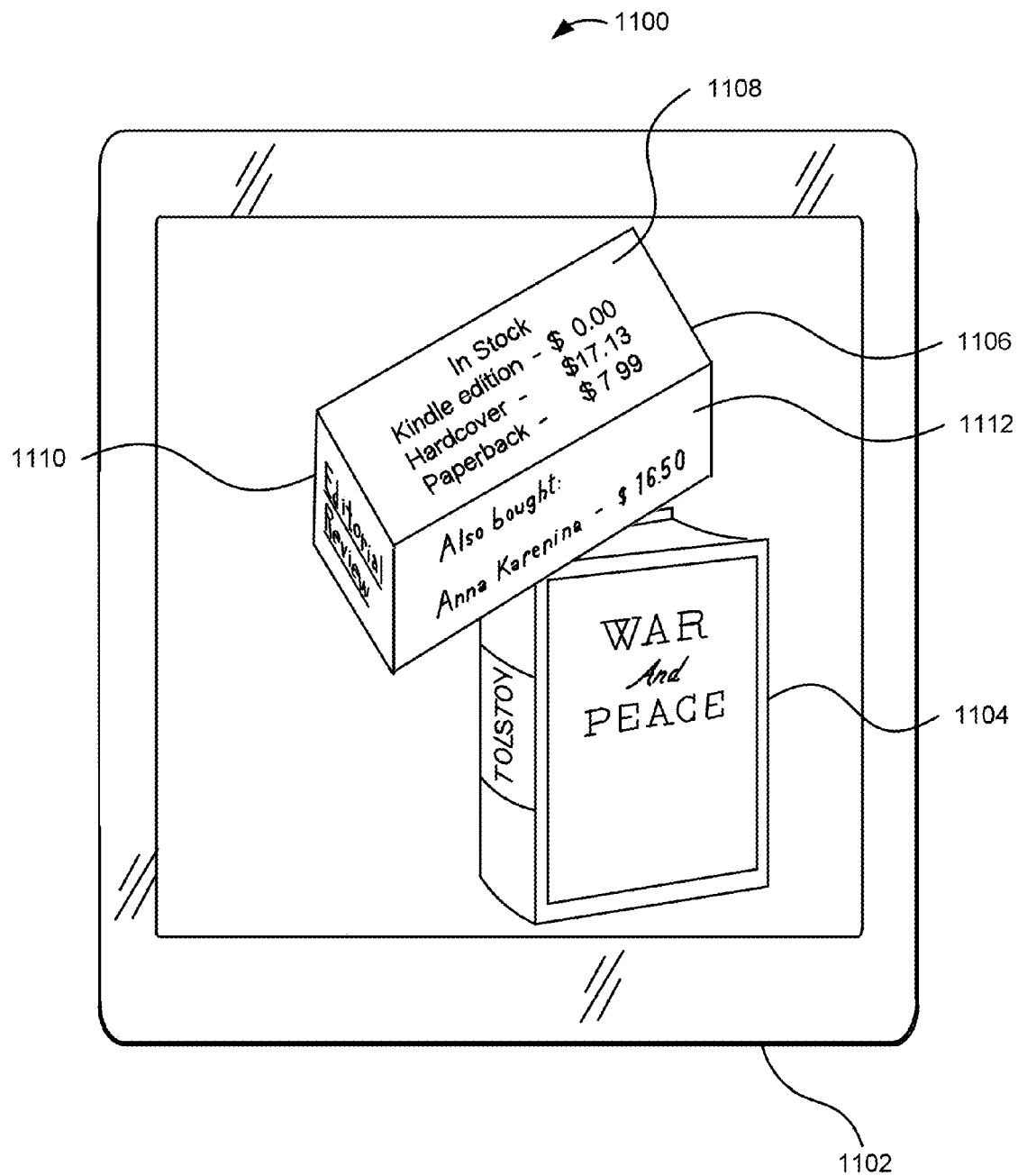
FIG. 11 illustrates another example of augmenting an image of an object captured and displayed in real time with associated content as rendered on the electronic device in accordance with an embodiment.

FIG. 11 illustrates an example 1100 of augmenting an image of an object captured and displayed in real time with associated content as rendered on the electronic device in accordance with an embodiment described in some detail above in reference to FIG. 6. An electronic device display 1102 includes an image 1104 of an object taken with an image capture element (e.g., a camera) of an electronic device such as described above in reference to FIG. 8. The overlay element in this example is a 3D structure in the shape of a cube 1106 that overlays the image 1104. As shown, all sides of the cube display different pieces of information pertaining to the book (Leo Tolstoy, War and Peace). For example, side 1108 includes prices for the book in various editions (Kindle®, hardcover, and paperback). Side 1110 includes selectable element named "Editorial Reviews" that links to reviews regarding the book. Side 1112 includes description of books bought by users who purchased the book (e.g., Anna Karenina by Leo Tolstoy). The cube may be moved by the user and different sides may show different pieces of product information, as described above in reference to FIG. 7. Thus, the example of the overlay presented in FIG. 11 allows a user to interact with overlaid content and move the overlay element (cube 1106) around the display screen so that all sides of the cube may show and display various pieces of product information associated with the displayed image of the product.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method, comprising:
    capturing an image of an item using an image capturing element;
    matching a feature represented in the image to stored features associated with items in an item repository to identify a matched item;
    retrieving selectable content associated with the matched item;
    determining a plurality of corners of the item using feature extraction to extract interest points from the image that correspond to the plurality of corners;
    determining a bounding box based at least in part on the plurality of corners;
    determining, for the bounding box, a perspective distortion that satisfies a predetermined distortion threshold; and
    displaying, on a display element, the selectable content as an overlay over the bounding box, wherein the matched item is presented for purchase in response to a selection of the selectable content.

2. The computer-implemented method of claim 1, wherein the overlay augments the image by overlaying the image, wherein the overlay is selected from one of: a box, a button, a three-dimensional (3D) structure, an animation, audio, video, web page, or interactive user interface.

3. The computer-implemented method of claim 1, wherein the image capturing element is selected from one of a video camera or a photo camera.

4. The computer-implemented method of claim 1, wherein the selectable content includes at least one of: a button or a hyperlink.

5. The computer-implemented method of claim 1, wherein the selectable content includes item information associated with the item and comprising at least one of: price, description, customer rating, customer review, special offers and promotions, or associated information related to associated merchandise.

6. The computer-implemented method of claim 5, wherein the item information is matched to stored information in a local repository associated with the image capturing element, and wherein the stored information defines the items in an item repository.

7. The computer-implemented method of claim 5, wherein the item information is matched to stored information remote from an electronic device hosting the image capturing element, and wherein the stored information defines the items in an item repository.

8. The computer-implemented method of claim 1, further comprising:
    determining additional matched items to the item in response to multiple matches being found between the item and the items in an item repository.

9. The computer-implemented method of claim 1, further comprising: tagging the matched item with at least one of a current location identifier or a timestamp.

10. The computer-implemented method of claim 1, further comprising snapping a portion of the bounding box to a nearest sharp edge of a representation of the item.

11. A computer system, comprising:
    a processor; and
    a memory having computer-executable instructions that, when executed on the processor, cause the processor to:
    capture an image of an item using an image capturing element;
    match a feature represented in the image to stored features associated with items in an item repository to identify a matched item;
    retrieve selectable content associated with the matched item;
    determine a plurality of corners of the item using feature extraction to extract interest points from the image that correspond to the plurality of corners;
    determine a bounding box based at least in part on the plurality of corners;

determine, for the bounding box, a perspective distortion that satisfies a predetermined distortion threshold; and display, on a display element the selectable content as an overlay over the bounding box, wherein the matched item is presented for purchase in response to a selection of the selectable content.

12. The computer system of claim 11, the selectable content including at least one of: a button or a hyperlink.

13. The computer system of claim 11, wherein the selectable content includes item information associated with the item and comprising at least one of: price, description, customer rating, customer review, special offers and promotions, or associated information related to associated merchandise.

14. The computer system of claim 11, wherein the computer-executable instructions further cause the processor to tag the matched item with at least one of a current location identifier or a timestamp.

15. The computer system of claim 11, wherein the computer-executable instructions further cause the processor to initiate the purchase of the matched item upon receiving from the user a single interaction with the selectable content, the user having previously submitted account information for the purchase.

16. A non-transitory computer-readable storage medium having computer-executable instructions that, when executed by a computer, cause the computer to:

receive a sampled frame of a video being captured by an electronic device;

determine information representative of an item captured in the sampled frame;

match a feature from the information to stored features associated with items in an item repository to identify a matched item;

retrieve selectable content associated with the matched item;

determine a plurality of corners of the item using feature extraction to extract interest points from the image that correspond to the plurality of corners;

determine a bounding box based at least in part on the plurality of corners;

determine, for the bounding box, a perspective distortion that satisfies a predetermined distortion threshold; and display, on a display element, the selectable content as overlay over the bounding box, wherein the matched item is presented for purchase in response to a selection of the selectable content.

17. The non-transitory computer-readable storage medium of claim 16, wherein the selectable content includes at least one of: a button or a hyperlink.

18. The non-transitory computer-readable storage medium of claim 16, wherein the selectable content includes item information associated with the item and comprising at least one of: price, description, customer rating, customer review, special offers and promotions, and associated information related to associated merchandise.

19. The non-transitory computer-readable storage medium of claim 16, wherein the overlay is a box.

20. The non-transitory computer-readable storage medium of claim 16, wherein the computer-executable instructions further cause the computer to initiate purchase of the item upon receiving from the user a single interaction with the selectable content, the user having previously submitted account information.

* * * * *